(12) United States Patent
Naik et al.

(10) Patent No.: US 11,303,521 B1
(45) Date of Patent: Apr. 12, 2022

(54) SUPPORT PLATFORM WITH BI-DIRECTIONAL COMMUNICATION CHANNEL FOR PERFORMING REMOTE ACTIONS ON COMPUTING DEVICES

(71) Applicant: Dell Products L.P., Round Rock, TX (US)

(72) Inventors: Sharmad S. Naik, Bangalore (IN); Kurian George, Bangalore (IN); Ravi Kumar Nagavarapu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/152,860

(22) Filed: Jan. 20, 2021

(51) Int. Cl.
*H04L 29/08* (2006.01)
*H04L 41/0866* (2022.01)
*H04L 41/069* (2022.01)
*H04L 67/55* (2022.01)
*H04L 67/02* (2022.01)
*H04L 67/12* (2022.01)

(52) U.S. Cl.
CPC ........ *H04L 41/0866* (2013.01); *H04L 41/069* (2013.01); *H04L 67/02* (2013.01); *H04L 67/12* (2013.01); *H04L 67/26* (2013.01)

(58) Field of Classification Search
CPC ....... H04L 67/12; H04L 67/10; H04L 41/069; H04L 41/0866; H04L 67/26; H04L 67/02; H04W 4/70
See application file for complete search history.

(56) References Cited

U.S. PATENT DOCUMENTS

| 10,602,353 | B1* | 3/2020 | Berdy | H04W 4/70 |
| 10,904,038 | B1* | 1/2021 | Haque | H04L 12/66 |
| 2017/0201504 | A1* | 7/2017 | Funk | H04L 63/0471 |
| 2018/0213378 | A1* | 7/2018 | Brown | H04L 67/12 |
| 2019/0205541 | A1* | 7/2019 | Zimny | H04L 41/0893 |

(Continued)

OTHER PUBLICATIONS

Dell EMC, "SupportAssist for Enterprise Systems," Frequently Asked Questions, Dec. 5, 2020, 8 pages.

(Continued)

*Primary Examiner* — Chirag R Patel
(74) *Attorney, Agent, or Firm* — Ryan, Mason & Lewis, LLP

(57) ABSTRACT

An apparatus comprises a processing device configured to establish a bi-directional communication channel between a broker service of a support platform and a given computing device registered with the support platform, to receive at a portal interface of the support platform a request to perform a remote action on the given computing device, and to generate a first message comprising a command to execute the remote action on the given computing device. The processing device is also configured to provide the first message from the broker service to the given computing device over the bi-directional communication channel, to receive a second message comprising results of executing the remote action on the given computing device at the broker service from the given computing device over the bi-directional communication channel, and to output the results of executing the remote action on the given computing device at the portal interface.

20 Claims, 12 Drawing Sheets

(56) References Cited

U.S. PATENT DOCUMENTS

2019/0207866 A1* 7/2019 Pathak ................... H04L 41/12
2020/0177485 A1* 6/2020 Shurtleff ................ H04L 67/22

OTHER PUBLICATIONS

Dell Technologies, "Dell EMC SupportAssist Enterprise 2.x—Guide and Download," Dec. 5, 2020, 7 pages.
Dell Technologies, "Dell SupportAssist for PCs," Accessed Jan. 18, 2021, 2 pages.
Dell, "SupportAssist for Home PCs Version 3.8," User's Guide, Dec. 2020, 51 pages.
Oasis, "MQTT Version 5.0," OASIS Standard, Mar. 7, 2019, 137 pages.
Dell EMC, "TechDirect," Jan. 2019, 2 pages.

* cited by examiner

SUPPORT PLATFORM WITH BI-DIRECTIONAL COMMUNICATION CHANNEL FOR PERFORMING REMOTE ACTIONS ON COMPUTING DEVICES

FIELD

The field relates generally to information processing, and more particularly to device management in information processing systems.

BACKGROUND

Support platforms may be utilized to provide various services for computing devices managed by the support platforms. Such services may include, for example, troubleshooting and remediation of issues encountered on computing devices managed by a support platform. This may include periodically collecting information on the state of the managed computing devices, and using such information for troubleshooting and remediation of the issues. Services of a support platform may also or alternatively include management of software that is installed on computing devices. This may include various software vendors communicating with the support platform when upgrades are available for different applications or other software, and the support platform may push such upgrades to the computing devices that it manages.

SUMMARY

Illustrative embodiments of the present disclosure provide techniques for performing remote actions on computing devices utilizing bi-directional communication channels established between a support platform and the computing devices.

In one embodiment, an apparatus comprises at least one processing device comprising a processor coupled to a memory. The at least one processing device is configured to perform the steps of establishing a bi-directional communication channel between a broker service of a support platform and a given computing device registered with the support platform, receiving, at a portal interface of the support platform, a request to perform a remote action on the given computing device, and generating a first message comprising a command to execute the remote action on the given computing device. The at least one processing device is also configured to perform the steps of providing, from the broker service of the support platform to the given computing device over the bi-directional communication channel, the first message and receiving, at the broker service of the support platform from the given computing device over the bi-directional communication channel, a second message comprising results of executing the remote action on the given computing device. The at least one processing device is further configured to perform the step of outputting, at the portal interface of the support platform, the results of executing the remote action on the given computing device.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
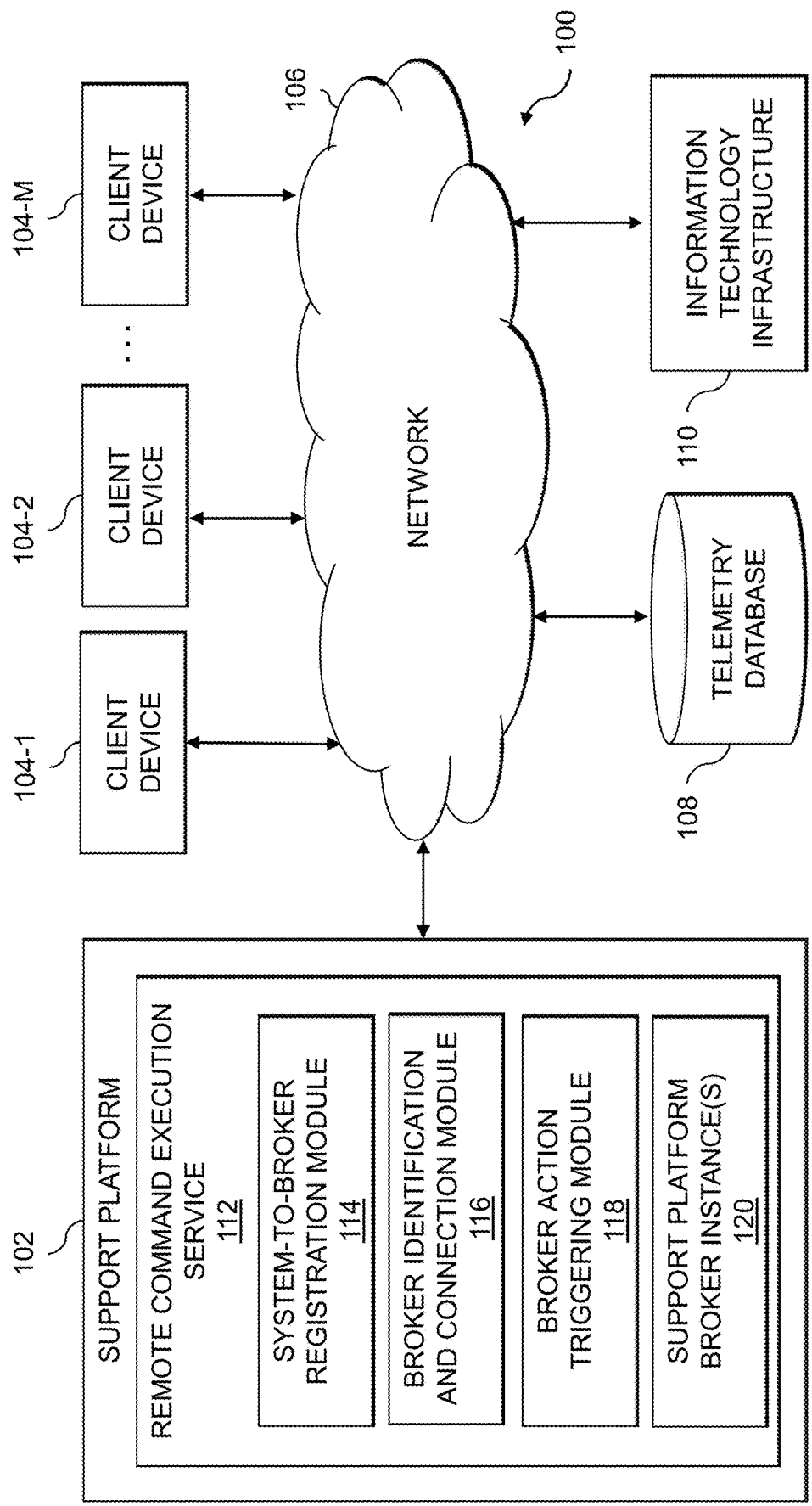
FIG. 1 is a block diagram of an information processing system configured for performing remote actions on computing devices utilizing bi-directional communication channels established between a support platform and the computing devices in an illustrative embodiment.

FIG. 1 shows an information processing system 100 configured in accordance with an illustrative embodiment. The information processing system 100 is assumed to be built on at least one processing platform and provides functionality for achieving low bandwidth bi-directional communication between a support platform 102 and systems managed using the support platform 102. The system 100 includes the support platform 102, which is configured to provide support for a set of client devices 104-1, 104-2, . . . 104-M (collectively, client devices 104), for assets of an information technology (IT) infrastructure 110 (e.g., physical and virtual computing resources in the IT infrastructure 110), combinations thereof, etc. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. The support platform 102, client devices 104 and IT infrastructure 110 are coupled to a network 106. Also coupled to the network 106 is a telemetry database 108, which may store various information related to the systems managed using the support platform 102 as will be described in further detail below.

In some embodiments, the support platform 102 is used for an enterprise system. For example, an enterprise may subscribe to or otherwise utilize the support platform 102 to manage a set of assets (e.g., assets of the IT infrastructure 110), client devices 104 operated by users of the enterprise, etc. As used herein, the term "enterprise system" is intended to be construed broadly to include any group of systems or other computing devices. For example, the assets of the IT infrastructure 110 may provide a portion of one or more enterprise systems. A given enterprise system may also or alternatively include one or more of the client devices 104. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. Thus, the client devices 104 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The telemetry database 108, as discussed above, is configured to store and record information relating to state and status of systems managed by the support platform 102. The telemetry database 108 may also store audit logs of remote commands executed on such systems utilizing the support platform 102. The telemetry database 108 in some embodiments is implemented using one or more storage systems or devices associated with the support platform 102. In some embodiments, one or more of the storage systems utilized to implement the telemetry database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 102, as well as to support communication between the support platform 102 and other related systems and devices not explicitly shown.

The client devices 104 are configured to access or otherwise utilize the IT infrastructure 110. In some embodiments, the client devices 104 are assumed to be associated with system administrators, IT managers or other authorized personnel responsible for managing assets of the IT infrastructure 110 (e.g., where such management includes troubleshooting issues encountered on one or more of the assets of the IT infrastructure 110). For example, a given one of the client devices 104 may be operated by a user to access a graphical user interface (GUI) provided by the support platform 102 to manage the assets of the IT infrastructure 110. The support platform 102 may be provided as a cloud service that is accessible by the given client device 104 to allow the user thereof to manage the assets of the IT infrastructure 110. In some embodiments, the assets of the IT infrastructure 110 are owned or operated by the same enterprise that operates the support platform 102 (e.g., where an enterprise such as a business provides support for the assets it operates). In other embodiments, the assets of the IT infrastructure 110 may be owned or operated by one or more enterprises different than the enterprise which operates the support platform 102 (e.g., a first enterprise provides support for assets that are owned by multiple different customers, business, etc.). Various other examples are possible.

In other embodiments, the support platform 102 may provide support for the client devices 104, instead of or in addition to providing support for assets of the IT infrastructure 110. For example, the support platform 102 may be operated by a hardware vendor that manufactures and sells computing devices (e.g., desktops, laptops, tablets, smartphones, etc.), and the client devices 104 represent computing devices sold by that hardware vendor. The support platform 102, however, is not required to be operated by a hardware vendor that manufactures and sells computing devices. Instead, the support platform 102 may be offered as a service to provide support for computing devices that are sold by any number of hardware vendors. The client devices 104 may subscribe to the support platform 102, so as to provide support including troubleshooting of issues encountered on the client devices 104. Various other examples are possible.

In some embodiments, the client devices 104 may implement host agents that are configured for automated transmission of information regarding state of the client devices 104 (e.g., such as in the form of telemetry information periodically provided to the support platform 102). Such host agents may also or alternatively be configured to automatically receive from the support platform 102 commands to execute remote actions (e.g., to troubleshoot and remediate actions encountered on the client devices 104 or assets of the IT infrastructure 110). Host agents may similarly be deployed on assets of the IT infrastructure 110.

It should be noted that a "host agent" as this term is generally used herein may comprise an automated entity, such as a software entity running on a processing device. Accordingly, a host agent need not be a human entity.

As shown in FIG. 1, the support platform 102 comprises a remote command execution service 112. As will be described in further detail below, the remote command execution service 112 is configured to achieve low bandwidth bi-directional communication between broker instances 120 of the support platform 102 and the systems (e.g., client devices 104 and/or assets of the IT infrastructure 110) managed using the support platform 102 for executing remote commands on such managed systems.

Although shown as an element of the support platform 102 in this embodiment, the remote command execution service 112 in other embodiments can be implemented at least in part externally to the support platform 102, for example, as a stand-alone server, set of servers or other type of system coupled to the network 106. In some embodiments, the support platform 102 and/or the remote command execution service 112 may be implemented at least in part within one or more of the client devices 104 and/or the IT infrastructure 110.

The remote command execution service 112 in the FIG. 1 embodiment is assumed to be implemented using at least one processing device. Each such processing device generally comprises at least one processor and an associated memory, and implements one or more functional modules for controlling certain features of the remote command execution service 112. In the FIG. 1 embodiment, the remote command execution service 112 comprises a system-to-broker registration module 114, a broker identification and connection module 116, and a broker action triggering module 118. The system-to-broker registration module 114 is configured to enroll systems to be managed by the support platform 102 and register them with the different broker instances 120 of the remote command execution service 112. The broker identification and connection module 116 is configured to receive a request to execute a remote command on a given one of the systems managed by the support platform 102, to identify the broker instance 120 that is registered with the given system, and to establish a connection between the identified broker instance 120 and the given system (e.g., a low bandwidth bi-directional communication channel). The broker action triggering module 118 is configured to utilize the established connection to send commands to be executed on the given system. Such commands may be automatically executed on the given system, possibly following end-user authorization.

It is to be appreciated that the particular arrangement of the support platform 102, the remote command execution service 112, the system-to-broker registration module 114, the broker identification and connection module 116, and the broker action triggering module 118 illustrated in the FIG. 1 embodiment is presented by way of example only, and alternative arrangements can be used in other embodiments. As discussed above, for example, the support platform 102, the remote command execution service 112, the system-to-broker registration module 114, the broker identification and connection module 116, and the broker action triggering module 118 may in some embodiments be implemented internal to one or more of the client devices 104 and/or the IT infrastructure 110. As another example, the functionality associated with the system-to-broker registration module 114, the broker identification and connection module 116, and the broker action triggering module 118 may be combined into one module, or separated across more modules with the multiple modules possibly being implemented with multiple distinct processors or processing devices.

At least portions of the system-to-broker registration module 114, the broker identification and connection module 116, and the broker action triggering module 118 may be implemented at least in part in the form of software that is stored in memory and executed by a processor.

It is to be understood that the particular set of elements shown in FIG. 1 for achieving low bandwidth bi-directional communication between the broker instances 120 of the support platform 102 and the systems managed using the support platform 102 for executing remote commands on such managed systems is presented by way of illustrative example only, and in other embodiments additional or alternative elements may be used. Thus, another embodiment may include additional or alternative systems, devices and other network entities, as well as different arrangements of modules and other components.

By way of example, in other embodiments, the remote command execution service 112 may be implemented external to the support platform 102, such that the support platform 102 can be eliminated.

The support platform 102 and other portions of the system 100, as will be described in further detail below, may be part of cloud infrastructure.

The support platform 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104, IT infrastructure 110 and the support platform 102 or components thereof (e.g., the remote command execution service 112, the system-to-broker registration module 114, the broker identification and connection module 116, and the broker action triggering module 118) may be implemented on respective distinct processing platforms, although numerous other arrangements are possible. For example, in some embodiments at least portions of the support platform 102 and one or more of the client devices 104 or the IT infrastructure 110 are implemented on the same processing platform. A given client device (e.g., 104-1) can therefore be implemented at least in part within at least one processing platform that implements at least a portion of the support platform 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the support platform 102, client devices 104, IT infrastructure 110, or portions or components thereof, to reside in different data centers. Numerous other distributed implementations are possible. The support platform 102 can also be implemented in a distributed manner across multiple data centers.

Additional examples of processing platforms utilized to implement the support platform 102 in illustrative embodiments will be described in more detail below in conjunction with FIGS. 7 and 8.

It is to be appreciated that these and other features of illustrative embodiments are presented by way of example only, and should not be construed as limiting in any way.

Figure 2:
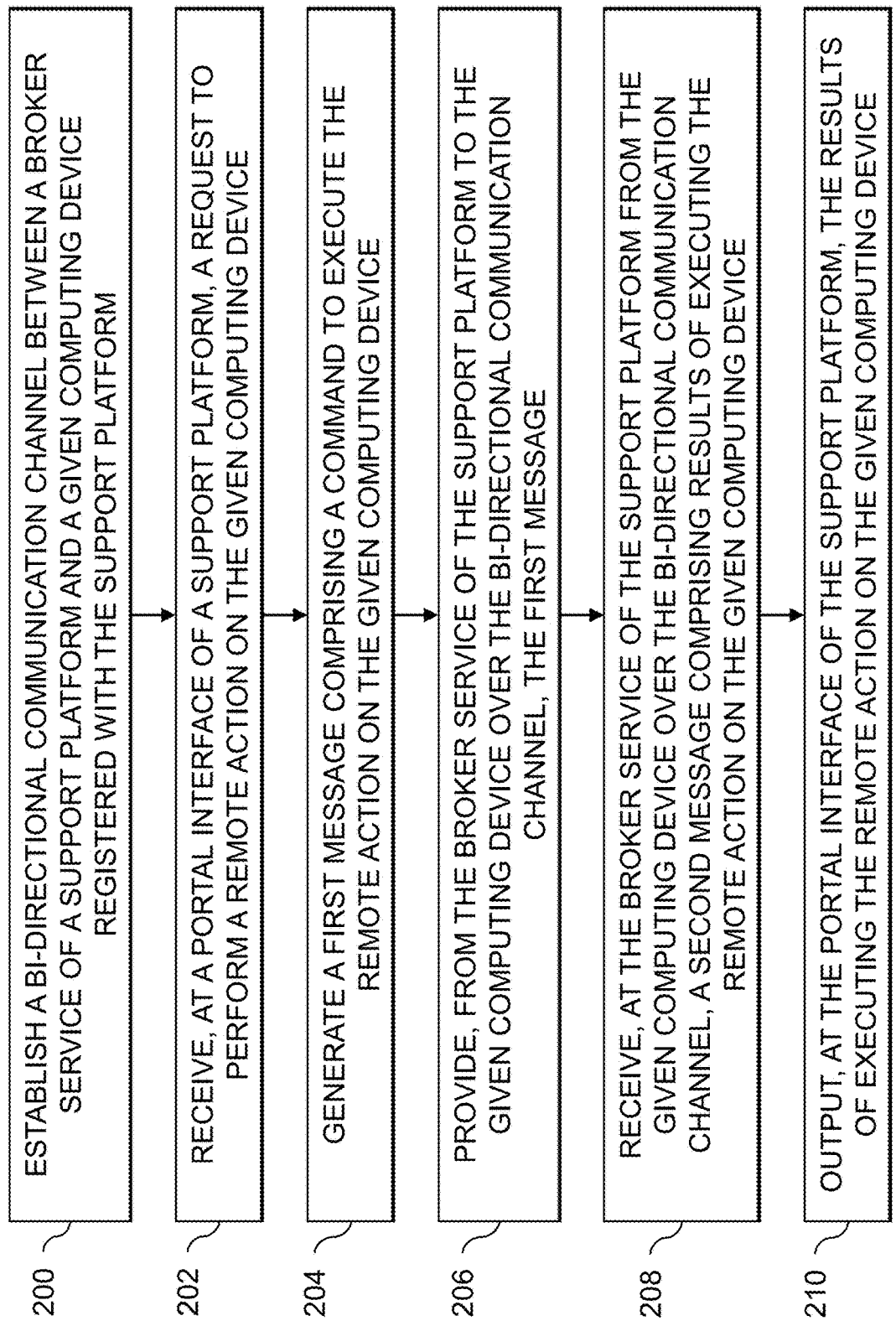
FIG. 2 is a flow diagram of an exemplary process for performing remote actions on computing devices utilizing bi-directional communication channels established between a support platform and the computing devices in an illustrative embodiment.

An exemplary process for performing remote actions on computing devices utilizing bi-directional communication channels established between a support platform and the computing devices will now be described in more detail with reference to the flow diagram of FIG. 2. It is to be understood that this particular process is only an example, and that additional or alternative processes for performing remote actions on computing devices utilizing bi-directional communication channels established between a support platform and the computing devices may be used in other embodiments.

In this embodiment, the process includes steps 200 through 210. These steps are assumed to be performed by the remote command execution service 112 utilizing the system-to-broker registration module 114, the broker identification and connection module 116, and the broker action triggering module 118. The process begins with step 200, establishing a bi-directional communication channel between a broker service of a support platform (e.g., support platform 102) and a given computing device (e.g., one of the client devices 104, one of the assets of the IT infrastructure 110) registered with the support platform. The bi-directional communication channel may comprise a Message Queue Telemetry Transport (MQTT)-based communication channel, such as a MQTT-based communication channel that utilizes a Hypertext Transfer Protocol Secure (HTTPS) with Web Socket Secure (WSS) connection.

Step 200 may be initiated by the given computing device to a given one of one or more broker instances of the broker service of the support platform. The given broker instance may be identified utilizing a connection string previously provided to the given computing device from the support platform responsive to a successful registration of the given computing device with the support platform. The FIG. 2 process may further include registering the given computing device with the support platform. Registering the given computing device with the support platform may comprise receiving, at a device registration service of the support platform, a registration request from the given computing device, and invoking a device provisioning service of the support platform to enroll the given computing device based at least in part on symmetric key attestation. Registering the given computing device with the support platform may further comprise generating, utilizing the device provisioning service, a call to the broker service to enroll the given computing device with a given one of the one or more broker instances of the broker service, registering, utilizing the broker service, the given computing device with the given broker instance, and providing, from the broker service to the given computing device via the device provisioning service and the device registration service, a connection string comprising a hostname of the given broker instance.

In step 202, a request to perform a remote action on the given computing device is received at a portal interface of the support platform. A first message comprising a command to execute the remote action on the given computing device is generated in step 204. Step 204 may include updating an audit log of the support platform with the request to execute the remote action on the given computing device, and invoking a publish-subscribe service of the support platform to publish the command to execute the remote action on the given computing device for an identifier associated with the given computing device. Invoking the publish-subscribe service of the support platform to publish the command to execute the remote action on the given computing device for an identifier associated with the given computing device may comprise determining, utilizing a device registration service of the support platform, a given one of the one or more broker instances of the broker service of the support platform that is registered with the identifier associated with the given computing device, and utilizing the publish-subscribe service of the support platform to publish the command to execute the remote action on the given computing device to the given broker instance of the broker service of the support platform.

The first message is provided from the broker service of the support platform to the given computing device over the bi-directional communication channel in step 206. In step 208, a second message comprising results of executing the remote action on the given computing device is received at the broker service of the support platform from the given computing device over the bi-directional communication channel. The results of executing the remote action on the given computing device are output at the portal interface of the support platform in step 210. The results of executing the remote action on the given computing device may comprise an indication of whether the remote action was successfully executed on the given computing device, telemetry data of the given computing device collected following execution of the remote action on the given computing device, etc. Step 208 may include providing, from the broker service of the support platform to a publish-subscribe service of the support platform, the results of executing the remote action on the given computing device, and publishing, via the publish-subscribe service of the support platform, the results of executing the remote action on the given computing device. Publishing the results of executing the remote action on the given computing device may comprise at least one of updating audit logs of the support platform associated with the identifier of the given computing device and displaying the results of executing the remote action on the given computing device via the portal interface of the support platform.

When a support platform (e.g., support platform 102) is troubleshooting a computing device (e.g., one of the client devices 104, an asset of the IT infrastructure 110), real-time or near real-time communication helps understand the most recent events which have happened on or involve that computing device. This is especially useful when there is a need to take some decisive action based on such events. Consider, for example, an end-user that contacts a support platform to explain an issue that they have encountered on their associated end-user computing device (also referred to simply as an end-user device). The support platform (e.g., such as via a technical support agent (TSA) thereof), will use the end-user's explanation to generate a recommendation for troubleshooting the encountered issue. If the support platform or TSA, however, does not have information on the most recent activities on the end-user device, this may result in an inaccurate or inappropriate recommendation being provided to the end-user. This will undesirably delay solution or remediation of the issue encountered by the end-user. Such inaccurate or inappropriate recommendations may be averted if the most recent state of the end-user device were available to the support platform (or TSAs thereof) while the end-user device is connected with the support platform. There is thus a need for techniques to enable real-time or near real-time communication of system state between end-user devices and a support platform, to help the support platform (or TSAs thereof) take appropriate steps to resolve issues encountered on end-user devices.

Figure 3:
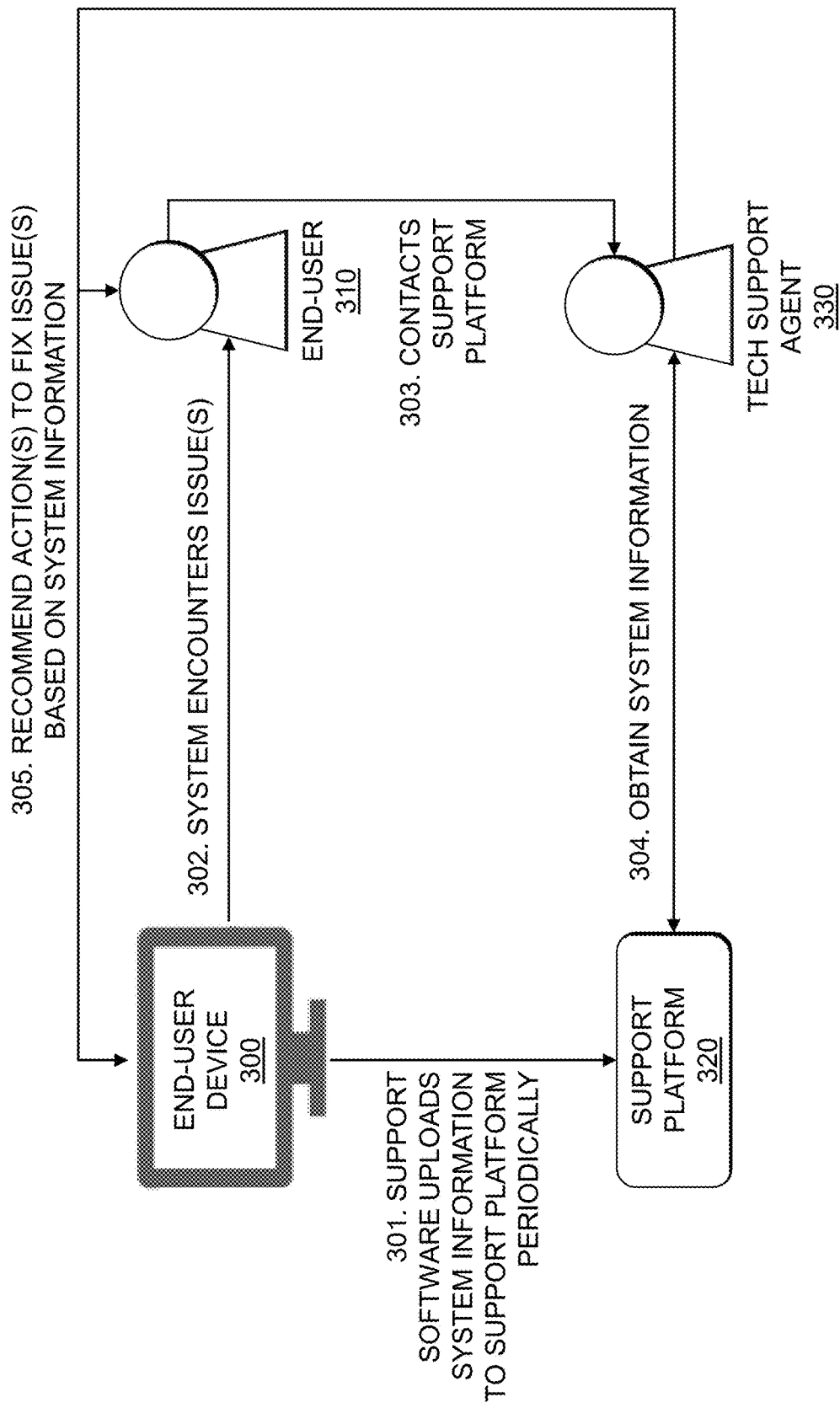
FIG. 3 shows a system flow for troubleshooting issues encountered on systems using a support platform in an illustrative embodiment.

FIG. 3 shows an overall flow of a TSA 330 of a support platform 320, which is engaged with an end-user 310 to help resolve an issue encountered on an end-user device 300. In step 301, support software running on the end-user device 300 periodically uploads system information to the support platform 320. In step 302, the end-user device 300 encounters one or more issues. In step 303, the end-user 310 contacts the TSA 330 of the support platform 320 for assistance in troubleshooting the encountered issues. In step 304, the TSA 330 obtains system information for the end-user device 300 from the support platform 320. In step 305, the TSA 330 recommends one or more actions to fix the one or more issues encountered on the end-user device 300 based on the system information obtained in step 304. Such recommendations may be provided from the TSA 330 to the end-user 310 (e.g., via a support chat which may or may not utilize the end-user device 300), to the end-user device 300, or combinations thereof. As will be described elsewhere herein, in some embodiments the TSA 330 or the support platform 320 may initiate remote actions on the end-user device 300 to troubleshoot and remediate the encountered issues, with or without requiring approval of the end-user 310. It should be noted that, without real-time or near real-time communication of system information from the end-user device 300 to the support platform 320, it is possible that the system information obtained by the TSA 330 in step 304 may be outdated (e.g., there may be more recent events that occurred on the end-user device 300 not yet reported to the support platform 320 in step 301).

Many decisions (e.g., remediation issues, sales, etc.) may be taken or based on available data. The more recent the data that a decision is based on, the better the decision may be. Consider, as an example, the end-user device 300 of FIG. 3, which during a given iteration of step 301 reports a normal state or normal system information. The end-user 310 may subsequently install an application on the end-user device 300, after which performance of the end-user device 300 may become degraded. Thus, the end-user 310 encounters an issue in step 302 and contacts the TSA 330 in step 303. This may all take place before another iteration of step 301 (e.g., such that the "bad" state or system information indicating installation of the application that caused the performance slowdown) is not yet reported to the support platform 320. Thus, the TSA 330 may be looking at stale or outdated information in step 304, resulting in an inaccurate or inappropriate recommendation in step 305. Thus, successful troubleshooting and remediation of the issue is delayed. If, however, the support platform 320 were able to get the most recent system information from the end-user device 300, such information may be processed and used by the support platform 320 and TSA 330 to make a more accurate or appropriate recommendation in step 305 for resolving the issues encountered on the end-user device 300. Advantageously, this can reduce the time and effort required for troubleshooting and remediating issues, saving resources of the support platform 320 and TSA 330, as well as increasing end-user 310 satisfaction.

There may be many different scenarios in which the end-user 310 or the TSA 330 will base decisions on earlier or outdated data which is presented to them. The older the data is, the less effective the decisions taken based on that data. Consider, as an example, a TSA 330 that is trying to help the end-user 310 who has called or otherwise contacted the support platform 320. If the end-user 310 has called the support platform 320, then the TSA 330 may be in a live session with the end-user 310. The TSA 330 may use the support platform 320 to perform a remote connection to the end-user device 300, and start system diagnostics to try to solve issues encountered by the end-user 310. The encountered issues, for example, may be solved with a simple driver update. However, since the TSA 330 has no or insufficient clarity on the system state of the end-user device 300, the TSA 330 must connect to the end-user device 300 before providing an accurate recommendation to the end-user 310. If the end-user 310 has instead mailed or otherwise contacted the support platform 320 for troubleshooting, the TSA 330 will have to schedule a call or chat with the end-user 310 at a preferred time to perform a remote connection with the end-user 310 so that the TSA 330 can use the support platform 320 to connect to the end-user device 300 and start system diagnostics. In either case, there may be significant time and resources utilized in such approaches. Such troubleshooting actions may happen on a daily basis, and often end-users such as end-user 310 will be in a live session with the TSA 330 to describe issues encountered on their associated end-user devices.

In some embodiments, the support platform 320 may provide a portal (e.g., a Tech Direct enterprise or commercial portal) where IT administrators can manage assets owned by their organization or other enterprise (e.g., assets of the IT infrastructure 110). This portal allows the IT administrators or other authorized users to see information of assets that they manage. The display is based on information being collected from such assets on a periodic basis, when customers or end-users take action on the assets, etc. Thus, considering that the system information may not be recent based on the view displayed in the portal to the IT administrators or other authorized users, this may result in inappropriate information across compliance reports resulting in overhead of more execution cycles being performed. Also, critical updates may miss being applied on the assets, which can result in performance being degraded.

Figure 4:
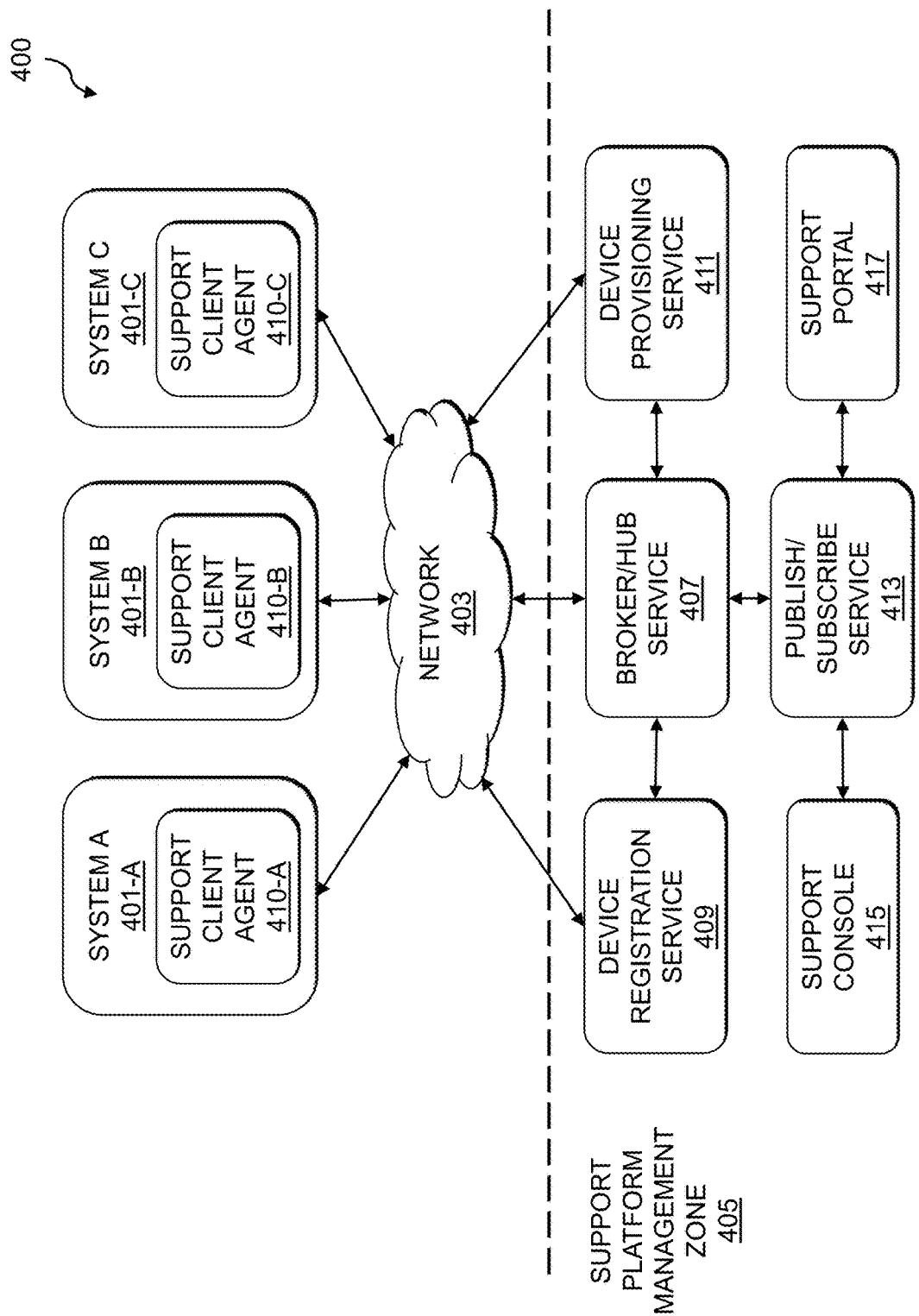
FIG. 4 shows a support platform environment in an illustrative embodiment.

FIG. 4 shows a system 400, in which a set of systems 401-A, 401-B, 401-C (collectively, systems 401) connect via a network 403 to a support platform management zone 405. The systems 401 are examples of computing devices that are configured to utilize a support platform. For example, the systems 401 may be the client devices 104 or assets of the IT infrastructure 110 in FIG. 1, end-user devices 300 in FIG. 3, etc. Each of the systems 401 runs a corresponding support client agent 410, which will be described in further detail below.

The support management zone 405, or more generally the support platform, includes a broker/hub service 407, a device registration service 409, a device provisioning service 411, and a publish/subscribe service 413, a support console 415 and a support portal 417. In some embodiments, the support management zone 405 utilizes a microservice architecture for providing different functions in the form of microservices. A microservice can run on its own process and communicate with other systems or services through a lightweight mechanism, such as a Hypertext Transport Protocol (HTTP) resource application programming interface (API) or communication API provided by an external system. Microservices in some embodiments are assumed to be independently deployable using fully automated deployment mechanisms. In some embodiments, microservices are small, independent and composable services that can be accessed through Representational State Transfer (RESTful) APIs. The separate and independent microservices may be used for discrete functions, providing potential benefits in innovation, manageability, resiliency and scalability. For example, the broker/hub service 407, the device registration service 409, the device provisioning service 411, the publish/subscribe service 413, the support console 415 and the support portal 417 may be implemented using microservices.

The systems 401 connect via the network 403 to the broker/hub service 407 running in the support platform management zone 405. The broker/hub service 407 connects with the publish/subscribe service 413, which is in turn connected to the support console 415 and the support portal 417. In some embodiments, the support platform management zone 405 is hosted in cloud infrastructure. The broker/hub service 407 connects to support software or applications running on the systems 401, to communicate recent system information on an on-demand basis. The communication channel between the systems 401 and the broker/hub service 407 is illustratively a bi-directional communication channel, where TSAs of the support platform can also query for specific updates from the systems 401, and the systems 401 can communicate specific information on a timely basis to the support platform.

As mentioned above, the systems 401 run respective "on-the-box" support client agents 410, from which bi-directional communication channels with the broker/hub service 407 can be initiated. Such "on-the-box" support client agents 410 may be integrated with existing support client agents or other support software that runs on the systems 401. The support client agents 410 are configured to initiate connections to the device registration service 409 (e.g., for registration), or to the broker/hub service 407 (e.g., after the registration is completed). The device registration service 409 is configured to try to enroll untrusted devices before handing over a connection channel to perform publish/subscribe communication via the device provisioning service 411. The device registration service 409 may be integrated with or inline with a "phone home" server of the support platform.

The device provisioning service 411 manages how systems 401 will be enrolled against different broker/hub instances in the support platform management zone 405. The support platform management zone 405, for example, may have multiple broker/hub instances, with the device provisioning service 411 enrolling different ones of the systems 401 against such different broker/hub instances. The broker/hub instances are collectively represented by the broker/hub service 407 in FIG. 4. The device provisioning service 411 may provide a centralized manager for registering particular systems 401 to broker/hub instances, and for re-allocating other broker/hub instances as needed and/or deleting systems 401 from broker/hub instances if the support client agent 410 running on a particular one of the systems 401 is uninstalled. The broker/hub service 407 is configured to register the systems 401 to itself, and will open secure bi-directional low bandwidth publish/subscribe-based channels between the systems 401 and the publish/subscribe service 413. In some embodiments, the secure bi-directional low bandwidth publish/subscribe-based channel is MQTT-based.

As illustrated in FIG. 4, the systems 401 will connect and communicate over low bandwidth MQTT channels to the broker/hub service 407 (e.g., after successful registration and provisioning using the device registration service 409 and device provisioning service 411 as described above). The broker/hub service 407 in turn updates details across the publish/subscribe service 413, which will display required information in the support console 415 and/or support portal 417 as desired. In some embodiments, the support console 415 may be utilized by TSAs of the support platform, whereas the support portal 417 may be utilized by IT administrators of enterprises to view and manage assets (e.g., one or more of the systems 401) of their respective enterprises. In other embodiments, however, the support console 415 and support portal 417 may be combined, or each may be accessible to both TSAs of the support platform and IT administrators of enterprises.

Figure 5A:
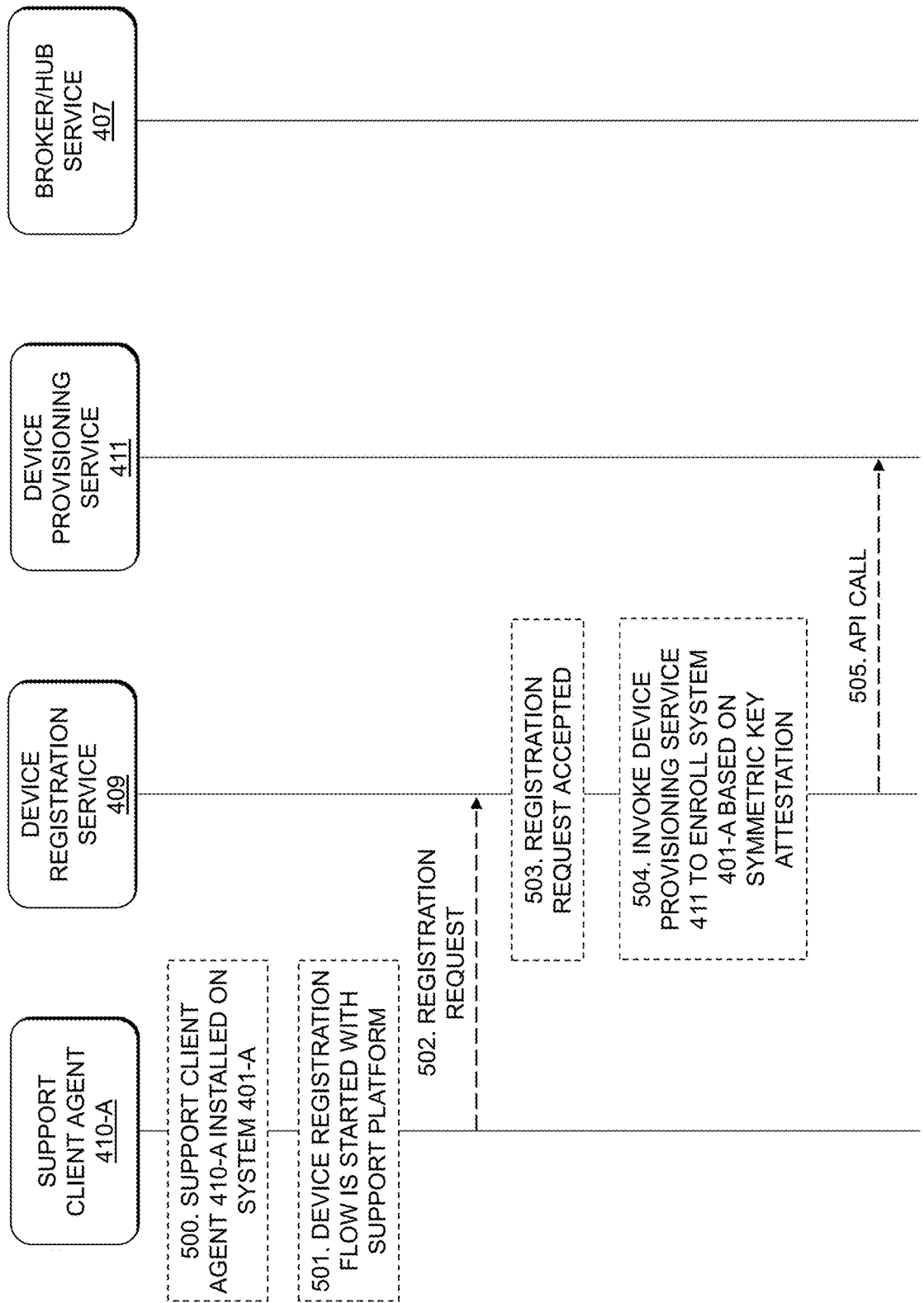
FIGS. 5A-5C show a process flow for enrollment with a support platform in an illustrative embodiment.

A registration process flow in the system 400 will now be described with respect to FIGS. 5A-5C. As shown in FIG. 5A, the registration process flow begins with a triggering event in step 500, where the support client agent 410-A is installed or upgraded on the system 401-A. On installation, the support client agent 410-A will start the device registration flow with the support platform in step 501. This includes sending a registration request from the support client agent 410-A to the device registration service 409 in step 502 (e.g., to onboard the system 401-A with the support platform). This will further help to map information collection on the system 401-A with a service tag or other identifier of the system 401-A that is onboarded to the support platform during the device registration. In step 503, the device registration service 409 accepts the registration request.

The device registration service 409 in step 504 then invokes the device provisioning service 411 to enroll system 401-A (e.g., via a representational state transfer (REST) application programming interface (API) call) and add the service tag or other identifier of the system 401 with one of the broker/hub instances of the support platform. In some embodiments, as noted above, it is assumed that the support platform includes multiple broker/hub instances. Each broker/hub instance may have a maximum capacity of the number of the systems 401 that can connect to it, and thus it may be desirable to have multiple broker/hub instances. The device registration flow and enrollment is thus distributed across the multiple broker/hub instances. This will help to both reduce the load across the broker/hub instances and maintain better latency especially when handling globally-distributed systems 401 (e.g., the broker/hub instances may also be geographically distributed). Step 504 may include or be based on symmetric key attestation, and initiates the REST API call with the device provisioning service 411 in step 505.

Figure 5B:
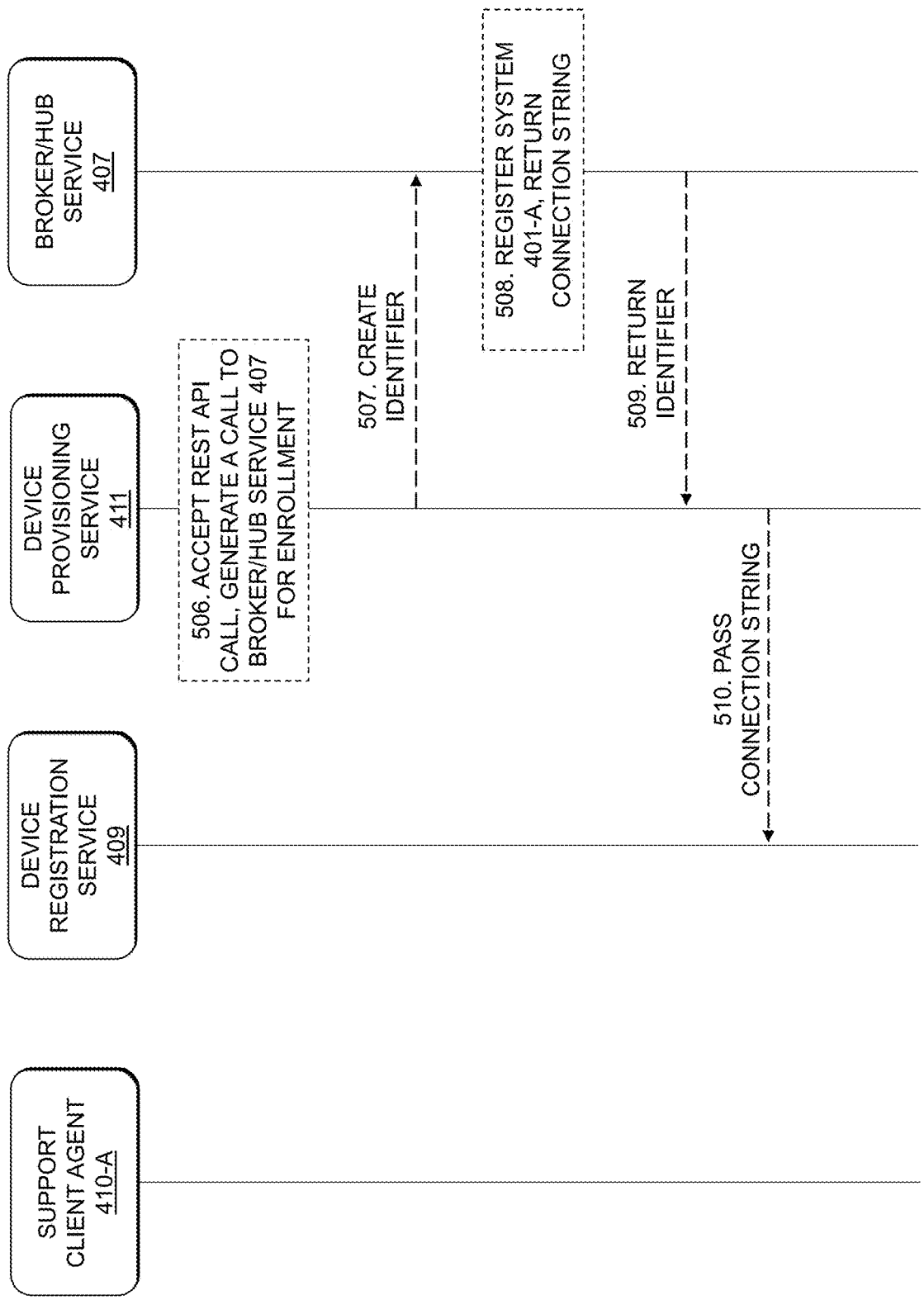

The registration process flow continues with step 506, shown in FIG. 5B, where the device provisioning service 411 accepts the REST API call, and generates a call (e.g., another REST API call) to the broker/hub service 407 for enrollment of the system 401-A. In step 507, an identifier (ID) is created for the system 401-A with the broker/hub service 407. The broker/hub service 407 in step 508 registers the system 401-A and returns a connection string. In step 509, the ID is returned to the device provisioning service 411. The device provisioning service 411 in step 510 then passes the connection string (generated by the broker/hub service 407 in step 508) to the device registration service 409.

Figure 5C:
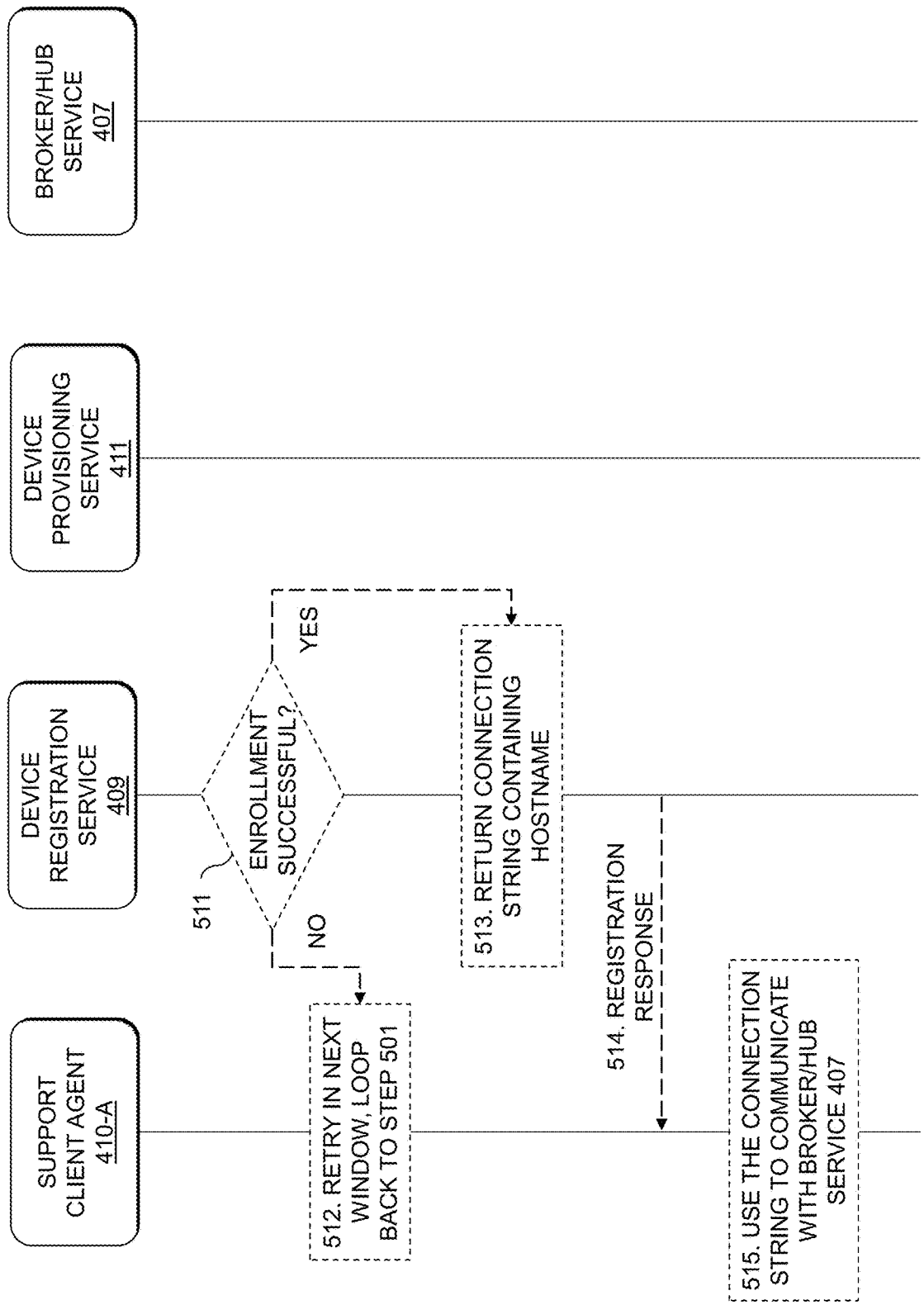

As show in FIG. 5C, the registration process flow continues in step 511 with the device registration service 409 determining whether enrollment was successful. If the enrollment is not successful, the device registration service 409 directs the support client agent 410-A to retry enrollment in a next window in step 512, and the registration process flow loops back to step 501. If the enrollment is successful, the device registration service 409 returns the connection string containing the hostname of the broker/hub instance in step 513, and this information is provided to the support client agent 410-A in a registration response in step 514. The support client agent 410-A in step 515 uses the connection string (e.g., the hostname included in the registration response of step 514) to communicate with the broker/hub service 407.

The registration process flow advantageously enables the broker/hub service 407 to "talk" to the system 401 (e.g., using the low bandwidth bi-directional communication channel, which may be MQTT based). The broker/hub service 407, prior to registration of the system 401-A, is not in a position to communicate with the system 401-A due to security considerations. Once the registration process flow is successful for the system 401-A, the support client agent 410-A is informed with the details of which broker/hub instance of the support platform that it should be able to communicate with, and the support client agent 410-A is able to initiate such communication (e.g., directly between the support client agent 410-A and the broker/hub service 407 via a given broker/hub instance). The device provisioning service 411 acts as a backbone for the registration process flow, whereby if any of the systems 401 need to be associated with another broker/hub instance, the systems 401 may be re-provisioned. Such re-provisioning may be triggered by various factors, such as change in location, change in properties such as entitlements, change in capacity or latency, etc. Such re-provisioning requests may be triggered by the support client agents 410 (e.g., similar to step 500).

A remote command execution process flow in the system 400 will now be described with respect to FIGS. 6A-6C. It should be noted that the remote command execution process flow assumes that the support client agent 410-A has successfully enrolled the system 401-A with a specific broker/hub instance in the support platform, and that the system 401-A and that broker/hub instance are able to communicate via the broker/hub service 407. Thus, in step 600-1, the support client agent 410-A initiates a connection to subscribe for updates from the support platform. Step 600-1 may utilize the connection string (described above with respect to FIGS. 5A-5C). In step 600-2, the broker/hub service 407 accepts the connection, and will notify the support client agent 410-A on detecting publish messages. The connection initiated between the support client agent 410-A and the broker/hub service 407 may comprise a bi-directional communication channel, such as an MQTT-based channel that utilizes a HTTPS with WSS connection.

The remote command execution process flow then begins with a triggering event in step 600-3, where a TSA initiates a remote action on system 401-A. Once this is achieved, the TSA will be able to see that a service tag or ID of the system 401-A is enrolled on a specific broker/hub instance, and can initiate a remote action on the system 401-A (e.g., performing a driver scan to know the latest drivers installed on the system 401-A). In step 601, the status is changed and the command is updated in audit logs of the support console 415. The command is then published in step 602 for the service tag or ID of the system 401-A, which may include an API call in step 603 sent from the support console 415 to the publish/subscribe service 413. The publish/subscribe service 413 will then identify the broker/hub instance for the service tag or ID of the system 401-A in step 604.

Figure 6A:
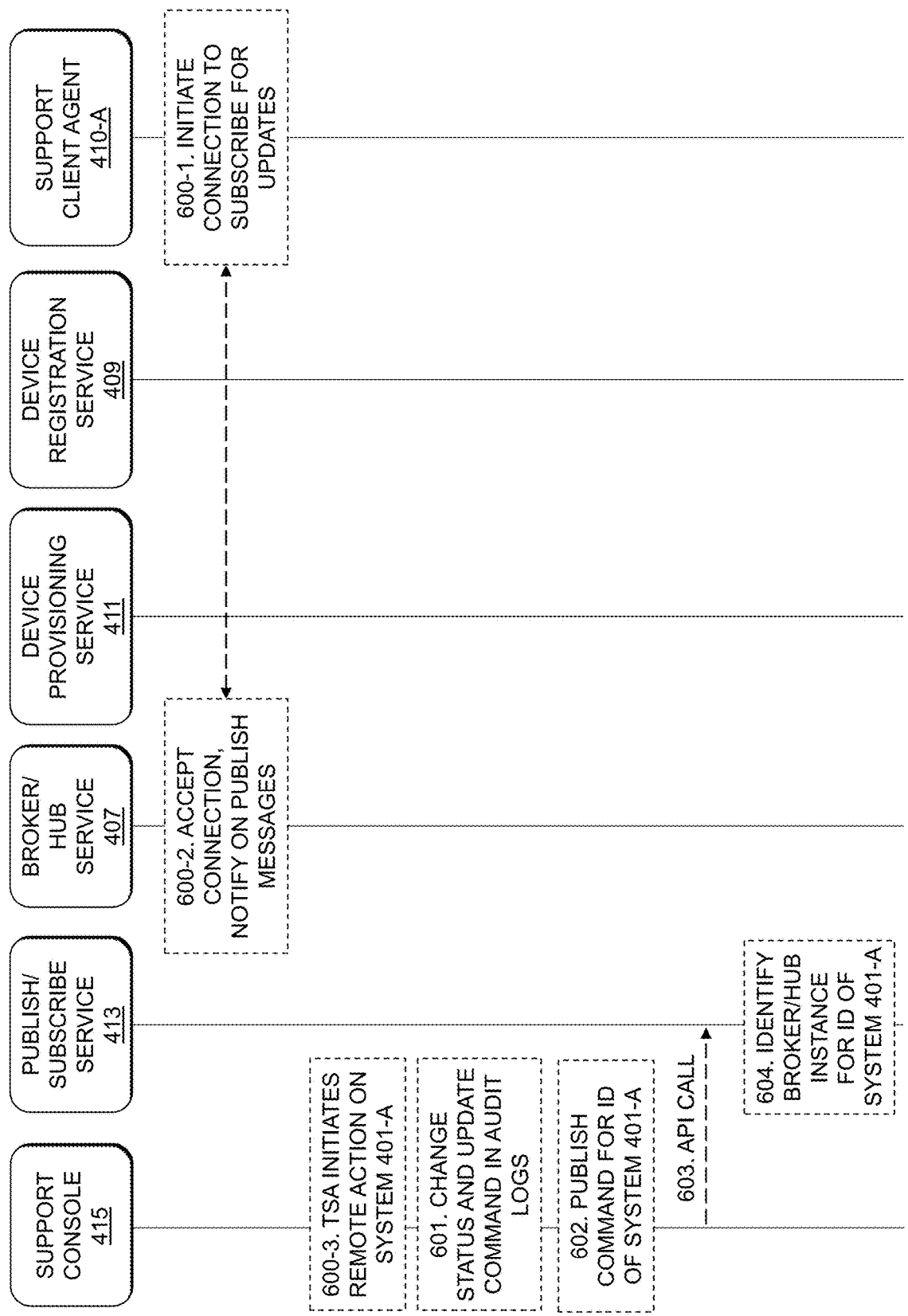
FIGS. 6A-6C shows a process flow executing remote actions on systems using a support platform in an illustrative embodiment.
Figure 6B:
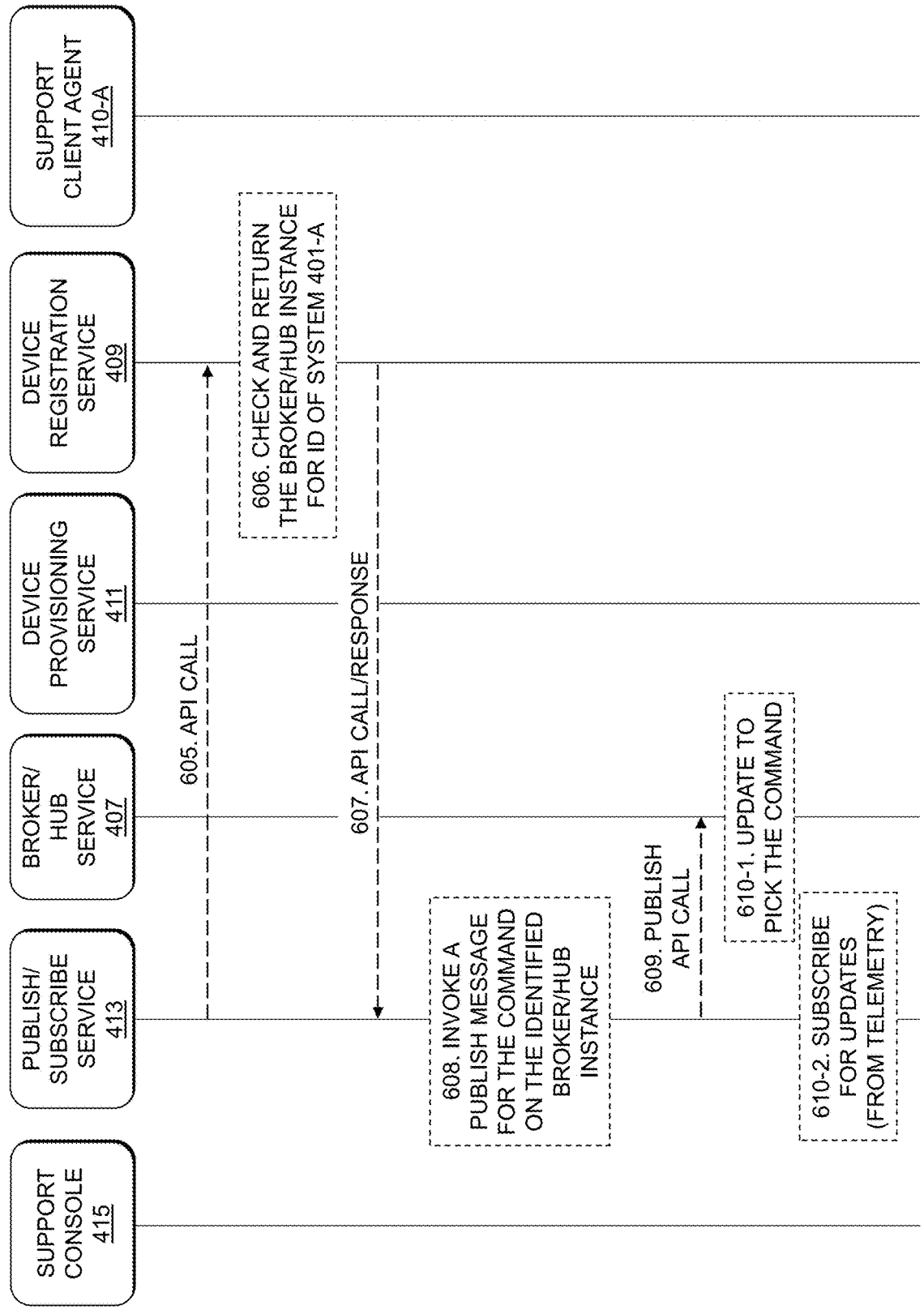

As shown in FIG. 6B, the publish/subscribe service 413 in step 605 initiates an API call to the device registration service 409, and in step 606 the device registration service 409 checks and returns the broker/hub instance for the service tag or ID of the system 401-A. Such information is returned from the device registration service 409 to the publish/subscribe service 413 in an API call/response in step 607. The publish/subscribe service 413 in step 608 then invokes a publish message for the command on the identified broker/hub instance. The publish/subscribe service 413 then issues a publish API call to the broker/hub service 407 in step 609. In step 610-1, the broker/hub service 407 will then update to pick the command, and in step 610-2 the publish/subscribe service 413 will subscribe for updates (e.g., from telemetry information for the system 401-A). Step 610-1 may utilize a publish REST API call, and step 610-2 may utilize a subscribe REST API.

Figure 6C:
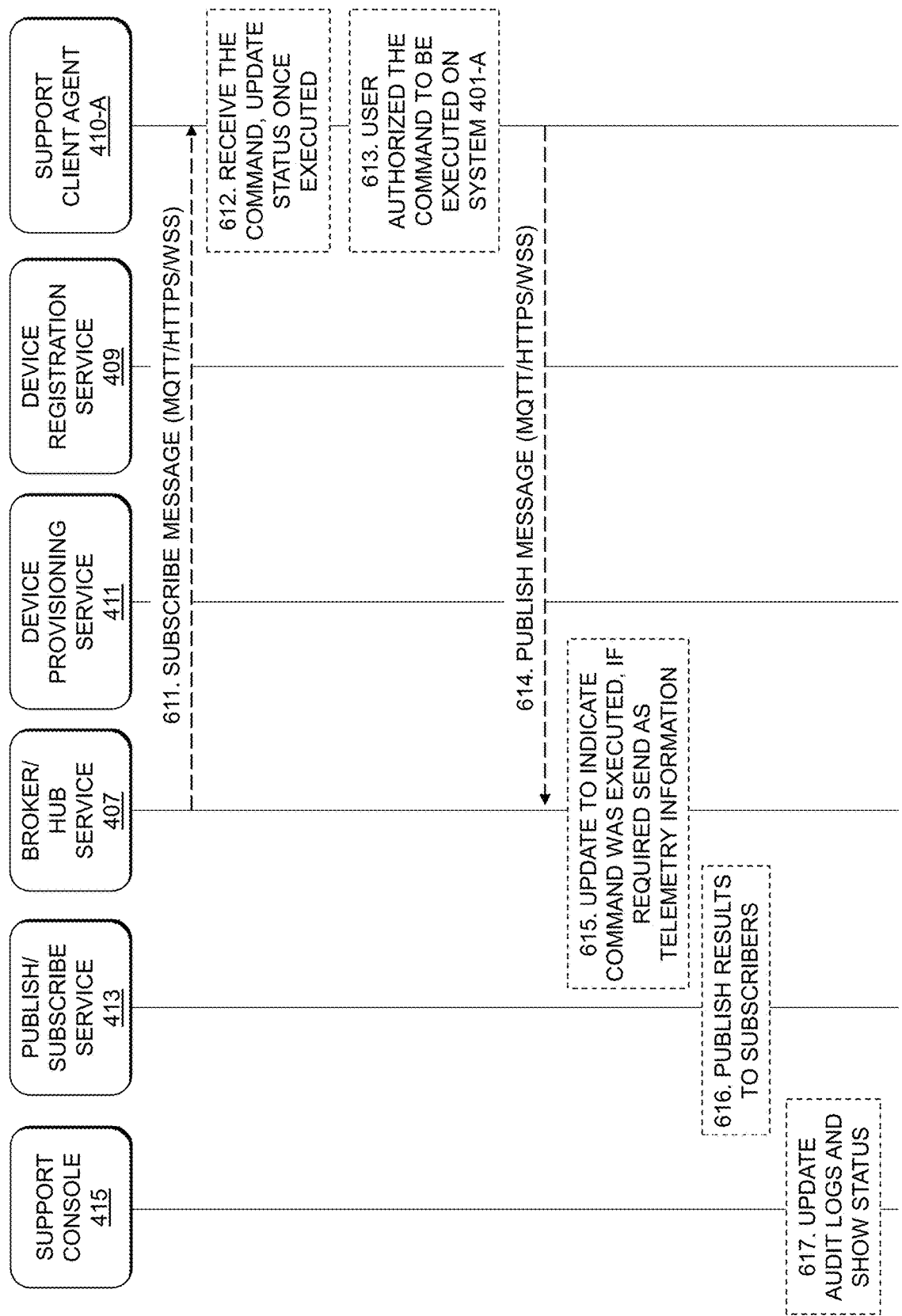

The remote command execution process flow, as shown in FIG. 6C, continues in step 611 with the broker/hub service 407 sending a subscribe message to the support client agent 410-A. Step 611 may utilize a low bandwidth bi-directional communication channel between the broker/hub service 407 and the support client agent 410-A, such as an MQTT-based channel that utilizes HTTPS with WSS connection. In step 612, the support client agent 410-A receives the command, and initiates execution of the command. Once executed, the status of the system 401-A is updated. In step 613, an end-user or IT administrator responsible for managing the system 401-A authorizes the command to be executed. The support client agent 410-A then sends a publish message back to the broker/hub service 407 in step 614. The publish message of step 614, similar to the subscribe message of step 611, may utilize a low bandwidth bi-directional communication channel between the broker/hub service 407 and the support client agent 410-A, such as an MQTT-based channel that utilizes HTTPS with WSS connection. The broker/hub service 407 in step 615 then updates to indicate that the command was executed, and if required sends this update in telemetry information. The publish/subscribe service 413 sees this update (as it subscribed for updates in step 610-2), and then publishes the results of the command to all subscribers in step 616. This will propagate to the support console 415, which in step 617 updates audit logs and shows the updated status of the system 401-A.

In the remote command execution process flow shown in FIGS. 6A-6C, once the details of the broker/hub instance are obtained, a publish message is issued for the service tag or ID of the system 401-A to push the message to the system 401-A. If the system 401-A is connected to the broker/hub instance (e.g., via the low bandwidth bi-directional communication channel), the message will be immediately picked up and acted upon by the system 401-A. If the system 401-A is currently offline or not connected to the broker/hub instance, the message will be queued and pushed to the system 401-A when it comes online or otherwise connects to the broker/hub instance. On execution of the command, the support client agent 410-A on the system 401-A updates the response as well as any telemetry information that it needs to support the response. The support console 415 is assumed to be a subscriber for that message, and it is thus published to the support console via the publish/subscribe service 413.

Although the remote command execution process flow of FIGS. 6A-6C is described with respect to a triggering event on the support console 415 (e.g., utilized by TSAs), the remote command execution process flow of FIGS. 6A-6C may alternatively be run on a triggering event in the support portal 417 (e.g., that is utilized by IT administrators of an enterprise to manage assets of the enterprise using the support platform).

Illustrative embodiments provide a number of advantages relative to conventional approaches. For example, using the techniques described herein a support platform may help end-users and TSAs to issue commands on end-user devices using remote actions without requiring the TSAs to log in to the end-user devices. This helps reduce end-user engagement duration with the TSAs, resulting in significant time and resource savings. Further, TSAs will not be required to use third-party tools (e.g., such as screen meeting tools) to debug using a live session what is happening on end-user devices. Managing remote commands can help provide cost savings as well, in part due to lowering license costs associated with such third-party tools. Further, the techniques described can save bandwidth and network resources, as only commands and results need to be exchanged between end-user devices and the support platform (rather than screen captures or other images/video). Various types of remote actions may be initiated on end-user devices using the techniques described herein, including performing remote actions and collecting telemetry information in response. Further, the techniques described herein enable backend services of a support platform to initiate notifications to end-user devices (e.g., such as recommended driver updates to help end-users move to a more stable or appropriate version of a driver in case there were concerns that the end-user was facing based on or as a result of use of a specific driver version). Further, support agents on end-user devices are enabled to initiate communication with the support platform (e.g., broker/hub instances thereof) to update system state based on different events that are happening on the end-user devices. This helps the TSA or IT administrators using the support platform to understand issues that the end-users are encountering.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing remote actions on computing devices utilizing bi-directional communication channels established between a support platform and the computing devices will now be described in greater detail with reference to FIGS. 7 and 8. Although described in the context of system 100, these platforms may also be used to implement at least portions of other information processing systems in other embodiments.

Figure 7:
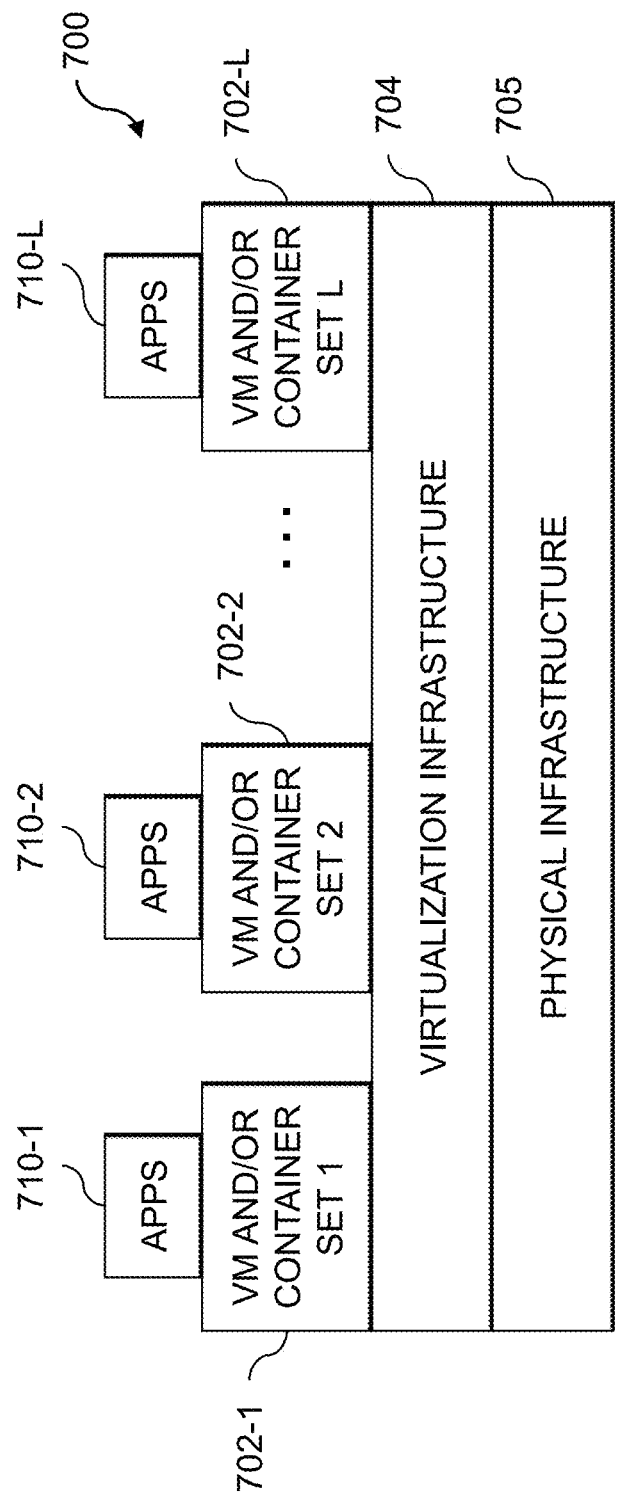
FIGS. 7 and 8 show examples of processing platforms that may be utilized to implement at least a portion of an information processing system in illustrative embodiments.
Figure 8:
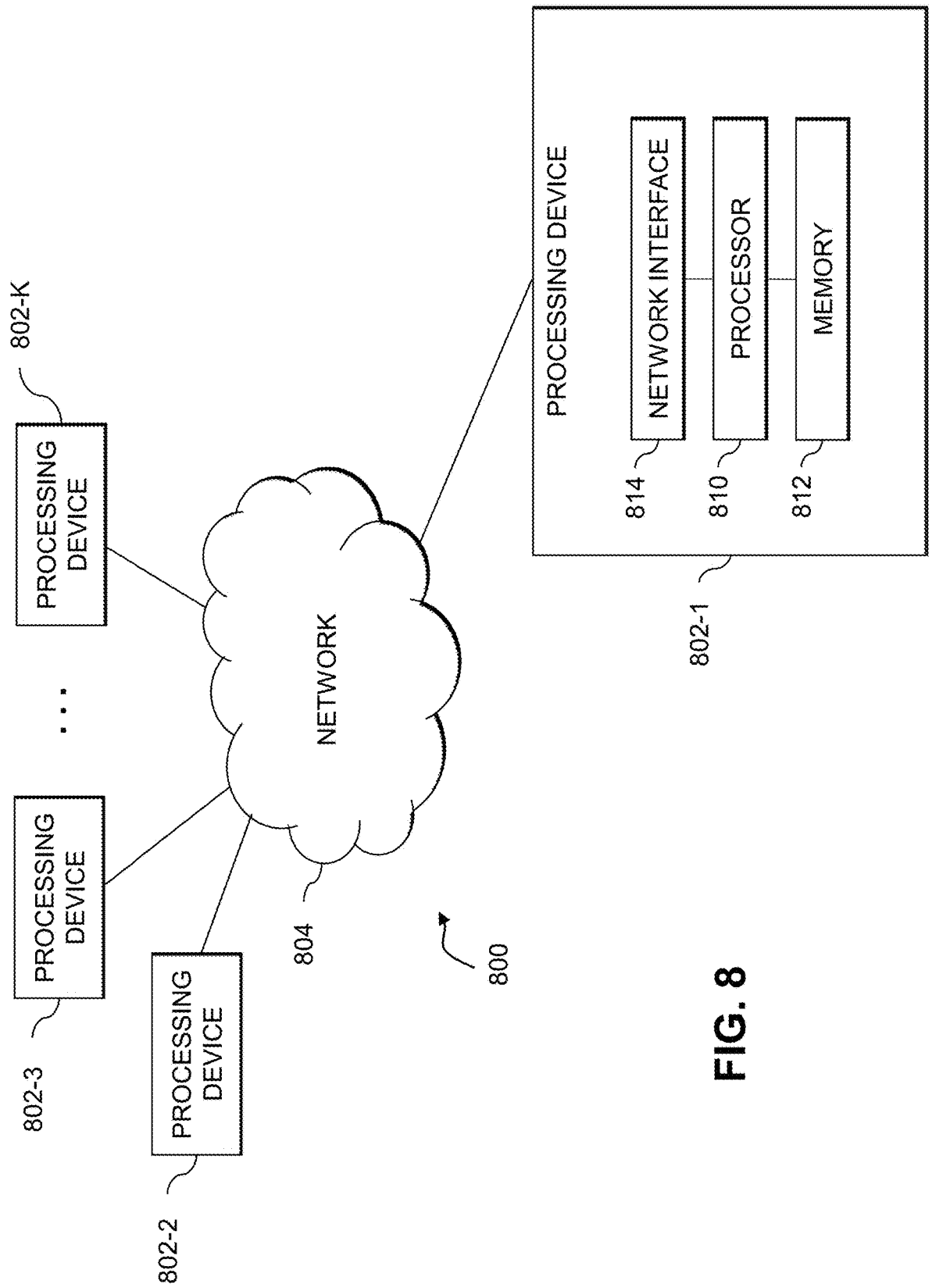

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing remote actions on computing devices utilizing bi-directional communication channels established between a support platform and the computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, end-user devices, remote commands, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      establishing a bi-directional communication channel between a broker service of a support platform and a given computing device registered with the support platform;
      receiving, at a portal interface of the support platform, a request to perform a remote action on the given computing device;
      generating a first message comprising a command to execute the remote action on the given computing device;
      providing, from the broker service of the support platform to the given computing device over the bi-directional communication channel, the first message;
      receiving, at the broker service of the support platform from the given computing device over the bi-directional communication channel, a second message comprising results of executing the remote action on the given computing device; and
      outputting, at the portal interface of the support platform, the results of executing the remote action on the given computing device;
   wherein establishing the bi-directional communication channel between the broker service of the support platform and the given computing device comprises:
      determining, based at least in part on the registration of the given computing device with the support platform, a given one of two or more broker instances of the broker service of the support platform associated with the given computing device; and
      establishing the bi-directional communication channel between the given broker instance and the given computing device.

2. The apparatus of claim 1 wherein the bi-directional communication channel comprises a Message Queue Telemetry Transport (MQTT)-based communication channel.

3. The apparatus of claim 2 wherein the MQTT-based communication channel utilizes a Hypertext Transfer Protocol Secure (HTTPS) with Web Socket Secure (WSS) connection.

4. The apparatus of claim 1 wherein establishing the bi-directional communication channel between the broker service of the support platform and the given computing device is initiated by the given computing device to the given broker instance.

5. The apparatus of claim 1 wherein the given broker instance is determined utilizing a connection string previously provided to the given computing device from the support platform responsive to the registration of the given computing device with the support platform.

6. The apparatus of claim 1 wherein the at least one processing device is further configured to perform the step of registering the given computing device with the support platform.

7. The apparatus of claim 6 wherein registering the given computing device with the support platform comprises:
   receiving, at a device registration service of the support platform, a registration request from the given computing device; and
   invoking a device provisioning service of the support platform to enroll the given computing device based at least in part on symmetric key attestation.

8. The apparatus of claim 7 wherein registering the given computing device with the support platform further comprises:
   generating, utilizing the device provisioning service, a call to the broker service to enroll the given computing device with the given broker instance;
   registering, utilizing the broker service, the given computing device with the given broker instance; and
   providing, from the broker service to the given computing device via the device provisioning service and the device registration service, a connection string comprising a hostname of the given broker instance.

9. The apparatus of claim 1 wherein generating the first message comprising the command to execute the remote action on the given computing device comprises:
   updating an audit log of the support platform with the request to execute the remote action on the given computing device; and
   invoking a publish-subscribe service of the support platform to publish the command to execute the remote action on the given computing device for an identifier associated with the given computing device.

10. The apparatus of claim 9 wherein invoking the publish-subscribe service of the support platform to publish the command to execute the remote action on the given computing device for an identifier associated with the given computing device comprises:
  determining, utilizing a device registration service of the support platform, the given broker instance that is registered with the identifier associated with the given computing device; and
  utilizing the publish-subscribe service of the support platform to publish the command to execute the remote action on the given computing device to the given broker instance.

11. The apparatus of claim 1 wherein the results of executing the remote action on the given computing device comprise an indication of whether the remote action was successfully executed on the given computing device.

12. The apparatus of claim 1 wherein the results of executing the remote action on the given computing device comprise telemetry data of the given computing device collected following execution of the remote action on the given computing device.

13. The apparatus of claim 1 wherein receiving the second message comprising the results of executing the remote action on the given computing device comprises:
  providing, from the broker service of the support platform to a publish-subscribe service of the support platform, the results of executing the remote action on the given computing device; and
  publishing, via the publish-subscribe service of the support platform, the results of executing the remote action on the given computing device.

14. The apparatus of claim 13 wherein publishing the results of executing the remote action on the given computing device comprises at least one of:
  updating audit logs of the support platform associated with the identifier of the given computing device; and
  displaying the results of executing the remote action on the given computing device via the portal interface of the support platform.

15. A computer program product comprising a non-transitory processor-readable storage medium having stored therein program code of one or more software programs, wherein the program code when executed by at least one processing device causes the at least one processing device to perform steps of:
  establishing a bi-directional communication channel between a broker service of a support platform and a given computing device registered with the support platform;
  receiving, at a portal interface of the support platform, a request to perform a remote action on the given computing device;
  generating a first message comprising a command to execute the remote action on the given computing device;
  providing, from the broker service of the support platform to the given computing device over the bi-directional communication channel, the first message;
  receiving, at the broker service of the support platform from the given computing device over the bi-directional communication channel, a second message comprising results of executing the remote action on the given computing device; and
  outputting, at the portal interface of the support platform, the results of executing the remote action on the given computing device;
  wherein establishing the bi-directional communication channel between the broker service of the support platform and the given computing device comprises:
    determining, based at least in part on the registration of the given computing device with the support platform, a given one of two or more broker instances of the broker service of the support platform associated with the given computing device; and
    establishing the bi-directional communication channel between the given broker instance and the given computing device.

16. The computer program product of claim 15 wherein the bi-directional communication channel comprises a Message Queue Telemetry Transport (MQTT)-based communication channel that utilizes a Hypertext Transfer Protocol Secure (HTTPS) with Web Socket Secure (WSS) connection.

17. The computer program product of claim 15 wherein establishing the bi-directional communication channel between the broker service of the support platform and the given computing device is initiated by the given computing device to the given broker instance, the given broker instance being determined utilizing a connection string previously provided to the given computing device from the support platform responsive to the registration of the given computing device with the support platform.

18. A method comprising:
  establishing a bi-directional communication channel between a broker service of a support platform and a given computing device registered with the support platform;
  receiving, at a portal interface of the support platform, a request to perform a remote action on the given computing device;
  generating a first message comprising a command to execute the remote action on the given computing device;
  providing, from the broker service of the support platform to the given computing device over the bi-directional communication channel, the first message;
  receiving, at the broker service of the support platform from the given computing device over the bi-directional communication channel, a second message comprising results of executing the remote action on the given computing device; and
  outputting, at the portal interface of the support platform, the results of executing the remote action on the given computing device;
  wherein establishing the bi-directional communication channel between the broker service of the support platform and the given computing device comprises:
    determining, based at least in part on the registration of the given computing device with the support platform, a given one of two or more broker instances of the broker service of the support platform associated with the given computing device; and
    establishing the bi-directional communication channel between the given broker instance and the given computing device; and
  wherein the method is performed by at least one processing device comprising a processor coupled to a memory.

19. The method of claim 18 wherein the bi-directional communication channel comprises a Message Queue Telemetry Transport (MQTT)-based communication channel that utilizes a Hypertext Transfer Protocol Secure (HTTPS) with Web Socket Secure (WSS) connection.

20. The method of claim 18 wherein establishing the bi-directional communication channel between the broker service of the support platform and the given computing device is initiated by the given computing device to the given broker instance, the given broker instance being determined utilizing a connection string previously provided to the given computing device from the support platform responsive to the registration of the given computing device with the support platform.

* * * * *